US012604883B2

(12) United States Patent
Correns et al.

(10) Patent No.: US 12,604,883 B2
(45) Date of Patent: Apr. 21, 2026

(54) DEVICE FOR MITIGATING UNWANTED LIFE FORMS IN A CROP FIELD

(71) Applicant: Deere & Company, Moline, IL (US)

(72) Inventors: Nico Correns, Mannheim (DE);
Wolfram Haiges, Magstadt (DE)

(*) Notice: Subject to any disclaimer, the term of this patent is extended or adjusted under 35 U.S.C. 154(b) by 299 days.

(21) Appl. No.: 17/247,612

(22) Filed: Dec. 17, 2020

(65) Prior Publication Data

US 2021/0176981 A1     Jun. 17, 2021

(30) Foreign Application Priority Data

Dec. 17, 2019     (DE) .......................... 102019219896.1

(51) Int. Cl.
A01M 21/04          (2006.01)
A01M 17/00          (2006.01)
(Continued)

(52) U.S. Cl.
CPC .......... A01M 21/046 (2013.01); A01M 17/00 (2013.01); A01M 21/04 (2013.01);
(Continued)

(58) Field of Classification Search
CPC .... A01M 17/00; A01M 19/00; A01M 21/046; A01M 21/04
See application file for complete search history.

(56) References Cited

U.S. PATENT DOCUMENTS 2,588,561 A * 3/1952 Opp ....................... A01B 21/08
                                                    47/1.3
2,591,597 A * 4/1952 Opp ................... A01M 21/046
                                                    47/1.3
(Continued)

FOREIGN PATENT DOCUMENTS

CN          2255149 Y      6/1997
DE          2328705 A1     1/1975
(Continued)

OTHER PUBLICATIONS

Merged English translation of KR 20080092025 A (Year: 2008).*
(Continued)

*Primary Examiner* — Peter M Poon
*Assistant Examiner* — Hae Rie Jessica Byun
(74) *Attorney, Agent, or Firm* — Hanley, Flight & Zimmerman, LLC

(57)          ABSTRACT

An apparatus for mitigating unwanted life forms, the apparatus comprising: a sensor system configured to detect an unwanted life form; an adjustable first electrode; an earthed second electrode; a voltage generator connected to the first and second electrodes; a conductivity generator for increasing conductivity between the first electrode and the unwanted life form; and a controller in communication with the sensor system, the voltage generator and the conductivity generator, the controller, using a signal from sensor system, adjusting the first electrode to a position adjacent to yet separate from the unwanted life form and the second electrode, engaging the conductivity generator and initiating a transfer of charge from the first electrode to the life form using the increased conductivity of the air between the first electrode and the life form.

18 Claims, 2 Drawing Sheets

(51) Int. Cl.
    *A01M 29/00*       (2011.01)
    *G05B 15/02*       (2006.01)
    *A01M 19/00*       (2006.01)

(52) U.S. Cl.
    CPC ............. *A01M 29/00* (2013.01); *G05B 15/02*
        (2013.01); *A01M 19/00* (2013.01)

(56) References Cited

U.S. PATENT DOCUMENTS

| | | | | |
|---|---|---|---|---|
| 3,559,337 | A * | 2/1971 | Marcoux | A01M 19/00 47/1.3 |
| 4,198,781 | A * | 4/1980 | Dykes | A01M 21/046 47/1.3 |
| 4,428,150 | A * | 1/1984 | Geiersbach | A01M 21/046 47/1.3 |
| 5,804,065 | A | 9/1998 | Kolz | |
| 6,171,098 | B1 | 1/2001 | Meyer et al. | |
| 6,795,568 | B1 * | 9/2004 | Christensen | A01M 21/04 382/110 |
| 10,701,926 | B2 * | 7/2020 | Struve | A01B 69/008 |
| 2003/0150156 | A1 * | 8/2003 | Flagler | A01M 19/00 47/1.3 |
| 2006/0265946 | A1 | 11/2006 | Schwager et al. | |
| 2008/0222942 | A1 | 9/2008 | Dalton | |
| 2010/0322477 | A1 * | 12/2010 | Schmitt | H04N 5/23254 348/222.1 |
| 2015/0027044 | A1 * | 1/2015 | Redden | A01M 21/043 47/58.1 R |
| 2015/0075067 | A1 * | 3/2015 | Stowe | A01D 34/835 47/1.3 |
| 2016/0050902 | A1 * | 2/2016 | Crisp | A01M 19/00 43/124 |
| 2017/0202202 | A1 * | 7/2017 | Crisp | A01M 17/00 |
| 2017/0215405 | A1 * | 8/2017 | Kent | A01M 21/04 |
| 2018/0111148 | A1 | 4/2018 | Batcheller et al. | |
| 2018/0325091 | A1 | 11/2018 | Kroeger et al. | |
| 2019/0223428 | A1 * | 7/2019 | De Andrade Coutinho Filho | E01H 11/00 |
| 2020/0205395 | A1 * | 7/2020 | De Andrade Coutinho Filho | H02H 7/10 |
| 2020/0383313 | A1 * | 12/2020 | Eberius | G06Q 10/04 |
| 2021/0092891 | A1 * | 4/2021 | Grant | A01M 21/043 |
| 2021/0169064 | A1 * | 6/2021 | Fox | A01B 47/00 |
| 2022/0053752 | A1 * | 2/2022 | Kilian | A01D 43/063 |
| 2022/0202004 | A1 * | 6/2022 | Voelkening | A01M 21/046 |
| 2022/0346365 | A1 * | 11/2022 | Diprose | A01M 21/046 |

FOREIGN PATENT DOCUMENTS

| | | | | |
|---|---|---|---|---|
| DE | 4026589 | A1 * | 8/1990 | A01M 19/00 47/1.3 |
| DE | 4039797 | A1 | 9/1991 | |
| DE | 19648111 | A1 | 6/1998 | |
| DE | 102008008096 | A1 | 8/2009 | |
| DE | 102016205336 | A1 | 10/2017 | |
| DE | 102017205293 | A1 | 10/2018 | |
| EP | 3406138 | A2 | 11/2018 | |
| EP | 3415004 | A1 | 12/2018 | |
| EP | 3443839 | B1 * | 12/2020 | A01G 13/0287 |
| FR | 2473265 | A1 | 7/1981 | |
| FR | 2487168 | A1 | 1/1982 | |
| JP | 2017158533 | A | 9/2017 | |
| KR | 20080092025 | A * | 10/2008 | |
| KR | 20140005523 | A | 1/2014 | |
| RU | 2492646 | C1 | 9/2013 | |
| WO | WO2004089075 | A2 | 10/2004 | |
| WO | WO-2014114899 | A1 * | 7/2014 | A01B 45/02 |
| WO | WO-2018050138 | A1 * | 3/2018 | A01M 19/00 43/124 |

OTHER PUBLICATIONS

Hartmut Böttger et al., New technology for variable spray dosing, pp. 142-143.

Martina Koller et al., Site-specific herbicide applications based on weed maps provide effective control, dated 2005, pp. 182-187, vol. 59, No. 3. Retrieved from the Internet <URL: https://escholarship.org/uc/item/35s0n6t1>.

Uri Shapira et al., Field spectroscopy for weed detection in wheat and chickpea fields, International Journal of Remote Sensing, 2013, dated May 8, 2012, pp. 6094-6108, vol. 34.

No. 17. Retrieved from the Internet <URL: https://www.tandfonline.com/doi/full/10.1080/01431161.2013.793860>.

Extended European Search Report and Written Opinion issued in European Patent Application No. 20207906.7, dated May 4, 2021, in 08 pages.

\* cited by examiner

DEVICE FOR MITIGATING UNWANTED LIFE FORMS IN A CROP FIELD

RELATED APPLICATIONS

This document claims priority based on German Patent Application No. 102019219896.1, filed on Dec. 17, 2019, which is hereby incorporated by reference into this application.

DESCRIPTION

The invention relates to a device for mitigating unwanted life forms in a crop field.

BACKGROUND

As a rule, in crop farming, it is not only the desired, cultivated plants that grow on a field, but other unwanted life forms also become established. These life forms may involve plants other than the desired plants (e.g., weeds), crop plants from previous cultivation that are no longer wanted, plants of the current cultivation that are, however, in excess and need to be removed, fungus or insects. In the domestic field there is also a need to mitigate unwanted life forms in order, for example, to mitigate weeds growing in a lawn or in the joints between paving stones.

SUMMARY

An apparatus for mitigating unwanted life forms, the apparatus comprising: a sensor system configured to detect an unwanted life form; an adjustable first electrode; an earthed second electrode; a voltage generator connected to the first and second electrodes; a conductivity generator for increasing conductivity between the first electrode and the unwanted life form; and a controller in communication with the sensor system, the voltage generator and the conductivity generator, the controller, using a signal from sensor system, adjusting the first electrode to a position adjacent to yet separate from the unwanted life form and the second electrode, engaging the conductivity generator and initiating a transfer of charge from the first electrode to the life form using the increased conductivity of the air between the first electrode and the life form.

A method for mitigating unwanted life forms, the method comprising: detecting, with a sensor system, an unwanted life form; adjusting, with a controller, a position of a first electrode to be adjacent to yet separate from the unwanted life form and an earthed second electrode; generating, with a conductivity generator, an increased conductivity between the first electrode and the unwanted life form; and initiating, with the controller, a transfer of voltage from a voltage generator to unwanted life form through the first electrode.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

DETAILED DESCRIPTION

Figure 1:
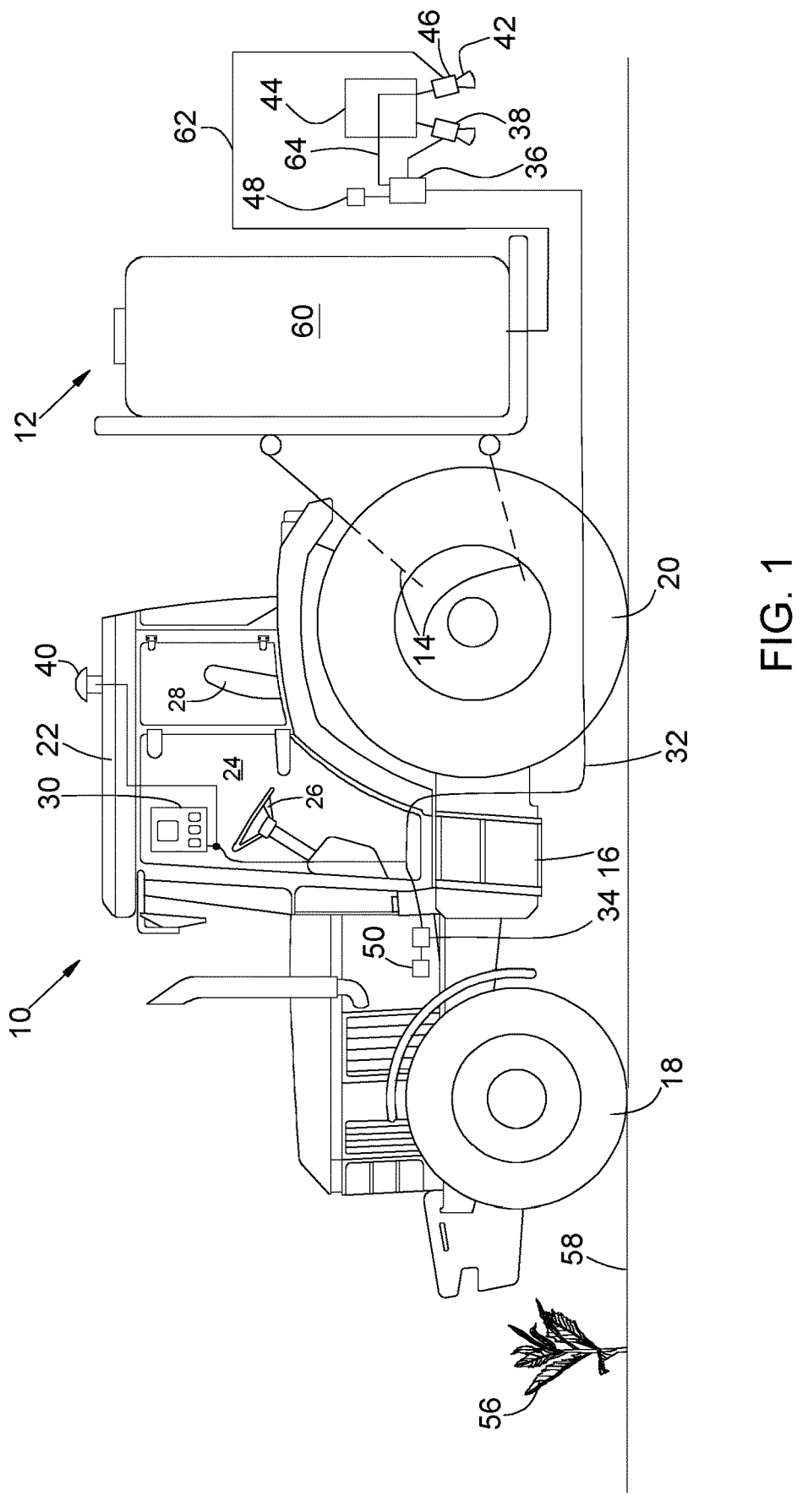
FIG. 1 shows a side view of a machine for applying an agent with an associated controller.

In order not to have to accept to greater reduction in the yield resulting from the unwanted life forms, it is common practice in agriculture and gardening to apply spray agents in order to mitigate these unwanted life forms. A field sprayer is used for this purpose; it can be designed as a self-propelled vehicle, as a trailer, or may be an attachment, and either applies the spray agent to the entire field, provided the crop plants are resistant to the spray agent, or the spray agent is only applied selectively where it is actually required (see German Patent Application No. DE 10 2017 205 293 A1). Essentially two approaches are known in the prior art for the selective application of spray agent:

It is, on the one hand, possible to enter the locations at which unwanted life forms are found into an electronic map of the field. This map can be prepared in the course of a reconnaissance of the field prior to the spraying process, either manually or using a sensor located on a vehicle or aircraft (cf. e.g. U. Shapira et al., Field spectroscopy for weed detection in wheat and chickpea fields, International Journal of Remote Sensing, 2013, Vol. 34, No. 17 pp. 6094-6108 or M. Koller et al., Site-specific herbicide applications based on weed maps provide effective control, California Agriculture, Vol. 59, No. 3, pp. 182-187). The nozzles of the field sprayer are driven automatically based on the map and of the current position of the field sprayer.

It is, on the other hand, also possible to fit the field sprayer, or a vehicle that is pulling or carrying it, with a local system for unwanted life forms, and to acquire these while travelling (online) in order to drive the nozzles of the field sprayer to apply the spraying agent to the unwanted life forms that have been acquired (cf. e.g. H. Böttger et al, Neue Technik zur variablen Spritzmitteldosierung (New technique for variable spraying agent application); Landtechnik March 2003, S. 142-143; or US Patent Publication No. 20180111148 with electrostatic charging of the spray mist).

Other approaches to mitigating unwanted organisms are based on a mechanical processing of unwanted plants that are detected (German Patent Application No. DE 196 48 111 A1) or on the application of hot water, plasma or electromagnetic waves (German Patent Application No. DE 10 2016 205 336 A1, Japanese Patent Appl. No. JP 2017-158533 A, WO 2004/089075 A2, German Patent Application No. DE 40 39 797 A1) or on an application of electric current or of high voltage for what is known as electrocution (European Patent Appl. No. EP 3 415 004 A1, French Patent Application No. FR 2 487 168 A1, French Patent Appl. No. FR 2 473 265 A1, US Patent Publ. No. 20060265946 A1, US Patent Publ. No. 20180325091 A1, WO 2018/050138 A1, Chinese Patent Appl. No. CN 2255149 Y).

When mitigating plants with electric current, the current flows from a generator, through a first electrode, through the plant, through the ground and back to the generator via a further electrode. When the electric circuit is closed, those parts of the plant through which the current flows are heated. When the boiling point is exceeded in enough of the plant's cells, it dies. The cells are, however, damaged, before reaching boiling point. As long as no direct mechanical and electrical contact is established between the plant and the first electrode (as in French Patent Appl. No. FR 2 473 265 A1 or WO 2018/050138 A1), but a certain distance is maintained between the electrode and the plant, the electric circuit between the first electrode and the plant is established by a spark gap. A spark gap is the discharge space between two conductors (in this case, the first electrode and the plant) in which a gas (in this case air) is disposed. As the voltage between the two conductors rises to the breakdown voltage, the electric field that arises leads to ionization of the gas disposed in the discharge space. This becomes conductive, and the gap is closed (short-circuited) by a spark within a fraction of a microsecond on account of the impact ionization. The breakdown voltage of a spark gap falls as result of ionizing radiation and moisture. The development of spark gaps can accordingly be encouraged by ionizing radiation (ultraviolet radiation, x-rays, gamma radiation, charged particles). In dry air under standard conditions (atmospheric pressure), about 1 kV is required per millimeter between the conductors before a spark strikes, depending on the gas that is present. This value can change and deviate significantly, depending on the type of gas or gas mixture, and on the air humidity and air pressure.

Mitigating plants with the aid of electric current (electroherbicide) is, in its present form, an innovative method with many advantages but also with serious disadvantages. Advantages are, for example, that it functions better than mechanical mitigate, since there is greater flexibility in time. On the one hand, work can take place on the plant stock at an earlier stage, since mechanical processing can only be carried out at a later stage when the crop plants are sufficiently robust. On the other hand, the mitigating work can also take place later, since larger weeds can be mitigated. It is at least as efficient as mitigation using chemicals; the roots of the plants are also damaged, and there is no need to consider the type of weed, since it is not necessary to apply different herbicides matched to a specific weed. Herbicide resistance cannot develop, the crop plants are not stressed by herbicide; the ground is not stressed with residues, there is no pollution of groundwater with residues, no pollution of surface waterways with chemicals, and a complex handling scheme is not necessary.

On the other hand, mitigating unwanted life forms with high voltage has the disadvantage that the location where the spark develops in individual cases cannot be predicted precisely.

Even the shortest distance between the electrode and the plant does not offer any certainty that the spark develops just there. The resistance of the complete electric circuit is crucial, and this depends on a large number of factors. In current systems for plant mitigation using high voltage, the advance speed of the systems is thus only at most 10 km/h. Field sprayers using chemical agents usually advance with a speed of 20 to 30 km/h. The working width is relatively low, being about 6 meters, while for present-day field sprayers the figure is up to 40 meters. Direct contact, or a very small gap between the electrode and the plant, is required. Only large weeds between small crop plants can be mitigated since if they are the same height, all the plants will be affected. The plants must not be too dry. If the ground is too dry, the process does not work (ground resistance is too high). There is a fire risk in the fields, and animals that are in the working region are also affected. The energy consumption is considerable, since all plants and plant parts are usually affected multiple times, since the current always seeks out the path of least resistance.

A comparison of the surface performance between the methods shows that with present-day field sprayers the figure is 40 m×30 km/h=20,000 m²/min, and with electroherbicide it is 6 m×10 km/h=1,000 m²/min. Present-day field sprayers are accordingly about 20 times more productive, and can also mitigate specific weeds.

It is true that it has been attempted to achieve a better-targeted transmission of the current to particular target plants, in that the electrodes that are in mechanical, and thereby electrical, contact with the plants are wetted with water (French Patent Appl. No. FR 2 473 265 A1), or that the electrode adjacent to the plant that is to be mitigated automatically adjusts its position in order to come sufficiently close or establish contact with unwanted plants (German Patent Appl. No. DE 40 39 797 A1, US Patent Publication No. 20180325091, WO 2018/050138 A1), although this however is unable to ensure in every case that the current discharge takes place at the desired location. It has also been proposed that the content of a water tank of a hand sprayer for mitigating plant diseases and insects is subjected to high voltage, in order to damage the unwanted life forms by the cloud of spray that is under high voltage, while the crop plants are not damaged as a result of the relatively small currents (Chinese Patent Appl. No. CN 2255149 Y). This method is not based on a spark discharge, but on a charge transfer through the individual water droplets which is at best suitable for killing off smaller organisms (seeds and pests), but not, however, for mitigating complete plants. In addition, the spray nozzle is in this case continuously subject to high voltage, which is disadvantageous from the point of view of working safety.

This disclosure provides a device for mitigating unwanted life forms through the application of electric current in which the disadvantages just mentioned do not occur, or only to a reduced extent, and that enables targeted mitigation. The device for mitigating unwanted life forms comprising a sensor system for the automatic detection of an unwanted life form, and a high-voltage source that is connected to a first electrode that can be brought into a position adjacent to yet separate from the unwanted life form, and to a second, earthed electrode, in order to achieve a flow of current through the unwanted life form through a transfer of charge over the gap between the first electrode and the life form. A conductivity generator is provided for the targeted increase in the conductivity of the air between the first electrode and the life form, and a controller that is configured to control the conductivity generator based on the signals of the sensor system.

Instead of a direct contact, or a small distance, between the life form to be mitigated, which can be a plant, an animal (e.g. insect), or a fungus, (and which is referred to below as the target plant or plant for the sake of simplicity) and the first electrode, a distance is in other words provided that can, for example, be about 350 mm. This distance is a compromise between the ease of handling of a cantilever arm, fitted with one or a plurality of electrodes arranged laterally adjacent to one another, that is moved over a field, and the technical (electrical) effort of bridging the distance. About 350,000 volts would be needed to bridge this distance with a spark, and there would be no control over the place where the strike would occur. It is proposed that, to hit exactly the target plant, the conductivity of the air between the first electrode and the target plant as recognized by the sensor system should be significantly increased. Through the increase in the conductivity, the magnitude of the voltage required falls at the same time, and the strike occurs at the desired location.

In this way, the target plant can be specifically mitigated without damaging crop plants in the near surroundings or the environment. The high productivity of current spray systems is nevertheless achieved. An increased conductivity between the electrode and the target plant can be achieved in two ways:

(a) The distance between the electrode and the target plant is bridged by a thin water jet. The conductivity of the water can be improved through an increased concentration of ions (e.g. the addition of small quantities of a liquid fertilizer). A pulse of current is triggered as soon as the water bridge is established. The current then only flows from the first electrode through the target plant. The electric field created in this way thus leads to an ionization of the gas located in the discharge space between the first electrode and the life form that is to be mitigated. This becomes conductive, and the gap is short-circuited by a spark within a fraction of a microsecond on account of the impact ionization.

(b) A plasma channel is generated by an extremely short laser pulse that markedly increases the electrical conductivity of the air. An electrode is aimed at the life form that is to be mitigated with this laser beam. The current pulse is then triggered, analogously to the water jet solution. Any effect that the laser might have on the plant or life form is fundamentally just a side effect. An insulating layer on the life form can, however, be penetrated by the laser beam, in order to achieve enough flow of current.

The electric circuit is closed from the nozzle of the water jet, or from the annular metallic ring aperture in front of the laser, via the above-ground part of the plant, the roots and the ground to the second electrode and the pulse generator.

The second electrode could be a simple sliding contact on the ground, a prong or a coulter (a cutting device). This disc can be pushed into the ground about 10-15 cm without applying a great force. Due to the better conductivity in lower layers of the soil, the second electrode should reach lowest possible soil levels. The respective second electrode should also be located close to the target plants. The second electrode could also be realized through a second water jet or plasma channel that is aimed at the ground or another part of the unwanted life form. (e.g. in the case of aircraft.)

The controller can be configured to control the quantity of electrical energy transmitted to an unwanted life form based on a property of the life form recognized by a sensor and/or sensor system. The property can be the size of the life form and/or a degree of dryness of the life form or its temperature. In the case of larger plants, it is, for example, enough to cause long-term damage to the roots. It should be possible to regulate or control the energy of the electric pulse in accordance with the need. The spark gap should be extinguished when the quantity of energy in each pulse is reached. More energy is required as a rule for large plants than for small plants in order to achieve a statistically reliable result. The shape (the length and/or height) of the electric pulse differs depending on the type of plant and the quality of the soil.

The controller can be configured if necessary, to reduce the temperature of the life form using the water jet or of another water jet. Since there is a potential risk of fire in dry weather, the temperature of the affected plant parts, or their degree of dryness, should if necessary be checked by, for example, of a thermal imaging camera. If the ignition temperature of the plants is almost reached, then either the pulse energy should be reduced (while remaining enough for the purpose) and/or the temperature of the plant parts should be lowered using a changed or additional water jet.

The nozzles or the laser can be aimed at the target plant in different ways. In one axis (the direction of travel) the movement of the vehicle or robot itself, to which the device is attached, is generally used. A suitable vehicle is, for example, shown in European Patent Appl. No. EP 3 406 138 A2, whose disclosure is incorporated through reference in the present document. In special cases, tilting and/or shifting in this axis may also be useful. The nozzles, or the lasers, are shifted or tilted in the axis transverse to the direction of travel. There are several ways of optimally striking the target plants. The water jet nozzle can be inclined in the direction of travel (e.g. 15 degrees), and the tilted or shifted transverse to the direction of travel in order to hit a target plant. Or a combination of different nozzles results in an overlaid jet which then goes in a different direction. Influencing factors such as speed of travel, movement of the frame itself, wind and the ground slope are to be considered when determining the tolerance allowance. When using the laser to generate the channel with ionizing air, the speed of travel and the wind speed are not relevant, since the establishment of the ionized air channel and of the spark gap takes place within a fraction of $1/1000$ of a second. One laser with fiber coupling and a multiplexer that supplies all the units serially with enough laser power is possible, as is a laser at each unit. The high voltage should be generated centrally by one generator or non-centrally by a plurality of generators.

The controller is preferably configured not to apply high voltage to the first electrode until after the controller has activated the conductivity generator for a targeted increase of the conductivity of the air between the first electrode and the life form. This avoids the possibility that the first electrode will be permanently at high voltage and that uncontrolled spark strikes could occur.

To achieve a more stable jet, starch, protein, cellulose or other materials can be added to the water. The additive should not have any negative properties for the crop plants and should be degradable without residue. A thin thread, so to speak, with good electrical conductivity should appear for a fraction of a second between the electrode and the target plant.

Preferably, the number of high voltage electrodes should be equal to the number of seed rows to be driven over in one working pass. A smaller or larger number may, however, also be appropriate. The position of the target plant in relation to the machine is determined through multi-dimensional image processing.

If the strength of the current (pulse) is not greater than that of a pasture fence, there is also no danger to people. At higher current strengths, the system is to be secured with appropriate devices.

Direct or alternating current may be employed. The effects on the objects that are struck arise in association with the strength and duration of the current (pulse).

Possible applications of the device according to the invention include:

Selective mitigation of pests: Pests on the plants and the surface of the soil can be mitigated specifically with a lethal pulse using this method. The current can influence the nerve system or on the cells. The bodies of the dead pests are not polluted by poisons.

Pests at the roots: For example: the larvae of the western corn rootworm, *Diabrotica virgifera*, feeds on the root crowns of the maize plants. These root crowns are rich in nutrients, which makes them good electrical conductors. The larvae are also good conductors of electric current. The current flow thus passes through the larvae. A current pulse that is lethal for the larvae causes no damage to the maize plant, or very little. The electric current should be introduced directly into the stem of the plant close to the ground in order to do no damage, or as little as possible, to the crop plant. When the time at which the pests are mitigated is close to the harvest, the strength of the current pulse should be significantly higher than when the early stock is processed. Close to the harvest, damaging the plants is less important, but the effect on the pests is significantly increased again. The system can here, for example, be attached to the corn header of a field chopper or the maize picker of a combine harvester.

Selective displacement as a protection for animals: Animals can be specifically displaced with this method, if the strength of the pulse is uncomfortable but not lethal for the animal. The current should only influence the nerve system. Using an attachment at the machine, animals (whether mammals, insects or birds) are selectively driven off the track that will be harvested next. The strength of the pulse is determined after the animal has been recognized. In this application, the second electrode can be realized by a second water jet.

Selection of crop plants: Thinning, pricking and clearing out of plants is possible. Plants need space if they are to develop. This is true both above and below ground. Otherwise, they struggle with one another for the space, light and nutrients that they all need to grow. The consequence is that the plants only grow feebly and cannot mature properly—and the harvest can then be correspondingly thin. The method described above is also suitable for being carried out together with weed mitigation.

Weed reduction with potatoes: The usual practice in conventional cultivation is to first use the haulm topper. In most cases, however, this is not enough to prevent the stocks from sprouting again, along with the associated impairment in the yield and quality. The haulm topper is therefore usually used in combination with a chemical drying agent. The haulm topper alone is also often not enough in ecological cultivation. High electrical voltage is passed through the plant with a targeted current pulse (as described above). The aim is for the cells in the regions of the plant through which the current flows to be sufficiently damaged, without any associated heating, for the water supply in the plant to be interrupted, causing it to dry out. This will affect the leaves and the roots.

Use on aircraft, e.g. drones: There are two methods for generating the pulse with aircraft: 1. The generator is located on board, and the second electrode is realized by a second water jet; and 2. Since an electrostatic charge with respect to the ground develops in aircraft, this can also be used as a source of voltage. The cause of the potential difference is charging through frictional electricity (triboelectric effect). The potential compensation (pulse) occurs by way of the water jet.

Combination of electrical and mechanical weed mitigation: The weeds are mitigated mechanically between the rows of seeds, while the mitigating takes place electrically within the seed rows.

Autonomous driving, e.g. robot mowing machine: The methods described above can also be adapted to (mowing) robots, wherein the two-jet solution, with a first jet for mitigating the life form and a second jet for earthing, is probably optimal. The (mowing) robot can also be used for weed mitigation on an area of ground, in a garden, or any desired area, even when it is raining. It would also be conceivable to implement such a device as a hand-held device with a conductivity generator for the targeted increase in the conductivity of the air is aimed by an operator, e.g. by using targeting device or a sensor and actuator controlled thereby at a life form to be mitigated, and activated by the operator through the use of a release mechanism or by the sensor. In the first case, the operator would thus act as the sensor system and controller. Such an arrangement can, for example, be used to mitigate other pests such as oak processionary moths or box tree moths for example.

Killing off germinable residues, e.g. lost seeds, in the combine harvester: The degradation of germinable residues, e.g. of lost seeds, at the outlet of the cleaning apparatus from the combine harvester could also be mentioned here as a further point. Occasionally mechanical methods (e.g. hammer mills) are used nowadays for the destruction of seeds, with herbicide treatments after the harvest as an alternative. The current pulse sterilizes the germinable residues.

Mitigating the bark beetle, its larvae, pupae and eggs: Bark beetles drill into the bark of still living trees, where they lay their eggs and feed on the bast, as a result of which the tree usually dies. Insecticides have only limited use in mitigating bark beetles, since when applied it is distributed through the entire tree by the flow of water and nutrient. All the insects living there are therefore harmed. The effect on bird life, for example as a result of eating affected insects, is unpredictable, as well as that on beneficial organisms (e.g. bees, bark-gnawing beetles, checked beetles, chalcid wasps etc.). The active materials also pass through the roots into the ground. This can lead to harmful effects on ground life forms. The groundwater is thereby also at risk. Preferably, the bark beetles and its various developmental stages should be mitigated in standing wood (to save the tree) and in lying wood. For this purpose, it is provided that the nozzles according to the invention for the high-pressure water jet should be placed directly (insulated) or a few millimeters above the bark. Fine holes are bored into the bark with the high-pressure system (which has a pressure of, for example, about 200 bar and a jet diameter of a few micrometers). The electrical connection to the life forms under the bark is established by the water jet. Since the bast tissue of a living tree is damp, a voltage cone forms there. Even if the life forms are not directly struck, they are killed by the potential difference in the body. The counter electrode is either a sprocket wheel that penetrates the bast, a second water jet, or a potential difference generated between the tree and the first electrode by earthing the second electrode. The solution using a laser to ionize the air and to drill through the bark also works.

This unit could be an additional device on the harvesting assembly of a harvester. A ring surrounds the trunk with the nozzles and the electrodes. An autonomous unit that climbs up standing trees and thus selectively or generally mitigates the bark beetles is also, however, conceivable. If deployed in good time, this can prevent the tree from dying. Either the entire trunk is treated in the manner described if bark beetles are suspected, or appropriate sensor systems are used so that only the affected locations are treated.

An infra-red camera can be used as a sensor system for detecting the bark beetle, operating, for example, in the range of wavelengths between 3500 and 15,000 nm. The change in the bast layer at the trunk can be detected in this way. This change results from the fact that the bark beetle destroys the layer of bast. The images from the camera are to be evaluated using image processing algorithms. The images of the IR camera should be supplemented by a high-resolution VIS camera that recognizes the features according to which a human makes a judgement. Further approaches could be methods that measure the noise emitted or deviations from the sound propagation caused by beetles and their developmental stages (see DE 10 2008 008 096 A1). Other pests such as oak processionary moths can, of course, be mitigated in this way.

FIG. 1 shows a side view of a machine 12 for mitigating unwanted life forms that is attached to a three-point linkage 14 of an agricultural tractor 10. The machine 12 could also be hitched to the agricultural tractor 10 or to another vehicle (device carrier or the like), or pulled by the agricultural tractor 10, i.e. comprise a chassis with wheels and a towbar suspended from a coupling of the agricultural tractor 10, or implemented as a self-powered vehicle (in particular a robot or drone). The agricultural tractor 10 is built on a supporting frame 16 that is supported on steerable front wheels 18 and drivable rear wheels 20 and carries a cabin 22 in which the operator's workplace 24 is located. The operator's workplace 24 comprises a steering wheel 26, a seat 28, pedals (not shown) and an operator's interface 30.

The operator's interface 30, which can be a virtual terminal, is connected to a data transmission device 32 which, in the form of embodiment illustrated, can be a serial data bus. The data transmission device 32 is furthermore connected to a working vehicle controller 34 of the agricultural tractor 10, a controller 36 of the machine 12 and a position determination device 40. All the devices mentioned exchange messages with one another during operation of the agricultural tractor 10 via the data transmission device 32. Further control units (not shown) are usually connected to the data transmission device 32, and can be grouped into what are known as working sets that communicate together with the virtual terminal 30 and, if relevant, other control units or working sets via the data transmission device 32. The protocol used here preferably corresponds to ISO 11783. It would, however, also be possible to wire the devices mentioned to one another directly, and/or to use any other protocol.

The position-determining device 40 receives signals from satellites and, potentially, from earth-bound transmitters, from which it ascertains the current position of the agricultural tractor 10 in at least two horizontal dimensions and, preferably, also its speed and direction of travel. These data are transmitted via the data transmission device 32 inter alia to the virtual terminal 30 and the controller 36.

A range of local sensor 38 is furthermore connected directly or via the data transmission device 32 to the controller 36. The local sensor 38, distributed over the working width of the machine 12, are attached to a crossbeam 44 of the machine 12, from where they face forwards. The local sensor 38 each comprise a camera with an image sensor and processor on which image processing software runs that makes it possible to recognize unwanted life forms 56 existing on a field 58 on the basis of the signals of the image sensor; in the illustrated example, this is a wild plant that was not planted on the field 58. The local sensors 38 can thus send data to the controller 36 regarding whether and, if relevant, at what place, an unwanted life form 56 can be recognized in the image it has captured. In general it would also be conceivable to place local sensor 38 for the detection of the life forms spatially separate from the actuators for mitigating the unwanted life forms, for example on the front side of the agricultural tractor 10 or on a drone flying in front of the agricultural tractor 10, and to convey the position and the type of any unwanted life forms that might be recognized to the actuators in a wireless or wired manner. As a result of the greater distance, it is possible to realize a higher travel speed with given reaction times of the sensor 38, including the image processing and of the actuators of the arrangement 46, which increases the working productivity and/or that more accurate evaluations of the image signals requiring more intensive computation can be realized.

The working vehicle controller 34 of the agricultural tractor 10 is connected to a speed control unit 50 that specifies the advance speed of the agricultural tractor 10 in that it for example controls the speed of rotation of a drive motor of the agricultural tractor 10 and/or the gear transmission ratio of a gearbox that connects the drive motor to the wheels 20 and possibly 18 for drive purposes. The agricultural tractor 10 is steered by the operator by the steering wheel 26 or by an automatic steering controller that drives the agricultural tractor 10 with reference to a planned route over the field 58, with reference to drive lanes that are present. The controller 36 is connected by way of the data transmission device 32 or a separate connection to arrangements 46 that serve to mitigate the unwanted life forms 56 through exposure to electric current.

Figure 2:
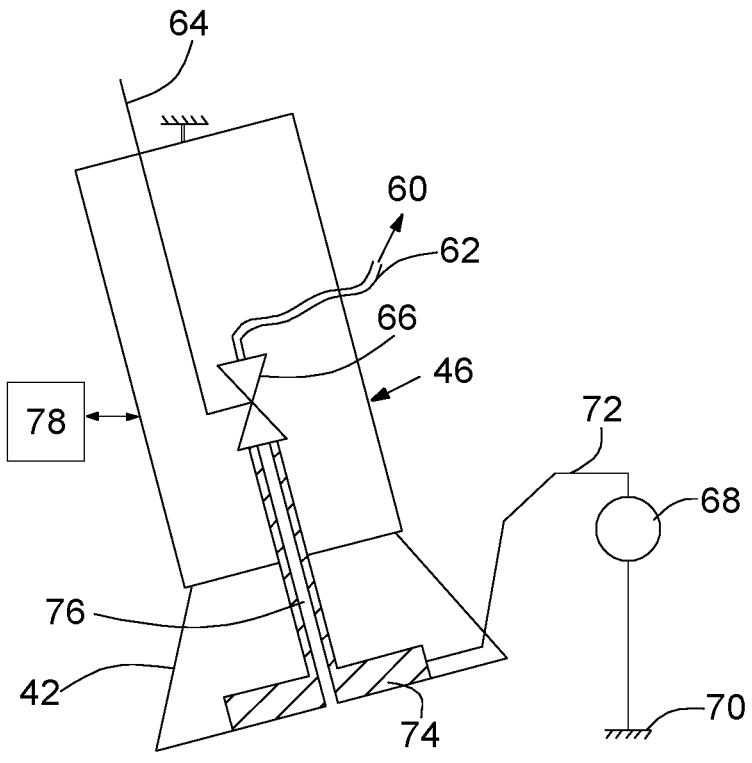
FIG. 2 shows schematically a first form of embodiment of a device attached to the machine for mitigating unwanted life forms.

A first example of an arrangement 46 is shown in FIG. 2. This example comprises a high-voltage source 68 that can comprise a voltage converter that is supplied by a generator of the agricultural tractor 10 and which provides a voltage in the general order of a few kilovolts and a current in the general order of a few milliamps that achieves a sufficient effect against the life forms/plants that are to be mitigated. One connection of the high-voltage source 68, which can supply direct or alternating current, is earthed by way of a contact 70 that can be implemented as a sliding contact or as a disc (coulter) that penetrates the ground. A further possibility would be to lead the current to ground from the high-voltage source via sliding contacts at the wheel rims or bearings of the wheels, through the wheels and sufficiently conductive tires of the trailer or tractor vehicle. The other terminal of the high-voltage source 68 is connected via a cable 72 to a conductive ring 74 that is arranged at the end of a nozzle arrangement 42. A reservoir container 60 containing water is connected via a pipe 62 to an electromagnetically operated valve 66 that is arranged between the pipe 62 and a pipe 76 that ends at the ring 74. An optional actuator 78 controlled by the controller 36 serves for adjusting the position of the arrangement 46 about a horizontal axis extending transversely to the forward direction and/or about a horizontal axis extending in the forward direction (or for the lateral displacement of the arrangement 46 transversely to the forward direction). The valve 66 is connected via a cable 64 to the controller 36 and is controlled by it.

Preferably a plurality of arrangements 46, as are shown in FIG. 2, are distributed over the working width of the machine 12. The arrangements 46 are fastened at the machine 12 by way of the crossbeam 44, which can be folded in for road travel, and which also carries the local sensor 38. A plurality or all of the arrangements 46 can share the high-voltage source 68, or a dedicated high-voltage source 68 is assigned to each arrangement 46.

The controller 36 is finally connected to a memory device 48 in which previously determined locations of unwanted life forms 56 have been entered onto a map in a geo-referenced manner. The map can have been generated during a previous transit of the machine 12 over the field 58 by the signals of the local sensor 38. The tasks of the controller 36 could also be performed by an arbitrary other controller, for example by a control unit in the virtual terminal 30. The virtual terminal 30 can serve to show the operator, by the controller 36, a map of the field and the positions of expected, unwanted life forms 56, for which purpose reference can be made to the signals of the position determination device 40 and the memory device 48. The controller 36 is in addition connected to the local sensor 38.

The mode of operation of the machine 12, fitted with one or a plurality of arrangements 46, is such that the controller 36 controls the actuator 78 in such a way that a water jet sent out from the nozzle 42 is aimed at the unwanted life form 56 as soon as this (with reference to the signals of one of the local sensor 38 and/or of the map in the memory device 48) enters into the active region of the arrangement 46 while the agricultural tractor 10 drives across the field with the machine 12. As soon as the unwanted life form 56 is within the active region of the arrangement 46, i.e. within a defined distance of, for example, a few tens of centimeters, the controller 36 causes the valve 66 to open in order to aim a water jet through the nozzle 42 at the unwanted life form 56. A voltage is applied to this water jet by the high-voltage source 68, since the ring 74 acts as the first electrode close to the life form 56 but spaced apart from it, and the contact 70 acts as the second, earthed electrode, while the life form 56 growing in the ground is itself earthed. The water jet promotes the transfer of the electric current from the first electrode onto the life form, since it specifically increases the conductivity of the air between the first electrode and the life form. A targeted current thus flows through the unwanted life form 56 that is enough to kill it without mechanical biological or chemical means being required.

The operation of the arrangement 46 by the controller can proceed analogously to the procedure according to German Patent Appl. No. DE 10 2017 205 293 A1, whose disclosure is incorporated with the present document through reference.

In the form of embodiment according to FIG. 2, the ring 74 is permanently at high voltage. Instead of this, a switch could be inserted into the cable 72 which is only closed by the controller 36 when the controller 36 opens the valve 66, or for the controller 36 only to switch the high-voltage source 68 on when the controller 36 opens the valve 66. There could also be a short time-offset between the opening of the valve 66 and the application of the high voltage to the ring 74, in order to ensure that the water jet has already reached the life form 56 before the high voltage is present at the ring 74. Possible spark strikes between the ring 74 and other objects located on the field that are not unwanted life forms are avoided in this way.

In the arrangement according to FIGS. 1 and 2, the water in the pipe 62, and therefore also in the reservoir container 60, is at least temporarily at high voltage. Care must therefore be taken to ensure adequate electrical insulation.

Figure 3:
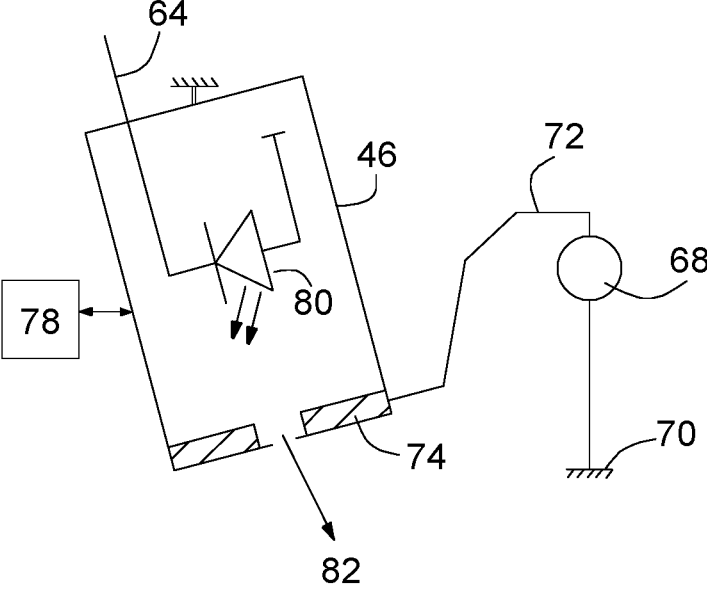
FIG. 3 shows schematically a second form of embodiment of a device attached to the machine for mitigating unwanted life forms.

FIG. 3 shows a second form of embodiment of an arrangement that manages without a reservoir container 60 and water jet, but uses a laser 80 (or another source of ionizing (electromagnetic) radiation, e.g. ultraviolet light, x-rays, gamma radiation, charged particles), illustrated here by way of example as a laser diode, in order to specifically increase the conductivity of the air between the arrangement 46 and the unwanted life form 56 as required in that an ionization of the air is caused by the light that is output. Elements that correspond to the first form of embodiment are given the same reference signs. A conductive ring 74 that is connected to the high-voltage source 68 is again arranged at the light outlet of the arrangement 46.

The mode of operation of the machine 12, fitted with one or a plurality of arrangements 46 according to FIG. 3, is such that the controller 36 controls the actuator 78 in such a way that a beam of light output from the laser 80 is aimed at the unwanted life form 56 as soon as this (with reference to the signals of one of the local sensor 36 and/or of the map in the memory device 48) enters into the active region of the arrangement 46 while the agricultural tractor 10 drives across the field with the machine 12. As soon as the unwanted life form 56 is within the active region of the arrangement 46, i.e. within a defined distance of, for example, a few centimeters, the controller 36 causes the laser 80 to operate in order to aim a beam of light through an outlet opening 82 at the unwanted life form 56. Again in this form of embodiment, the ring 74 acts as the first electrode close to the life form 56 but spaced apart from it, and the contact 70 acts as the second, earthed electrode, while the life form 56 growing in the ground is itself earthed. The beam of light ionizes the air between the ring 74 and the life form 56, i.e. its conductivity is raised above that of normal air, which encourages the transfer of the electric current from the first electrode to the life form 56. A targeted current thus flows through the unwanted life form 56 that is enough to kill it without mechanical biological or chemical means being required.

In the form of embodiment according to FIG. 3, the ring 74 is again permanently at high voltage. Instead of this, a switch could be inserted into the cable 72 which is only closed by the controller 36 when the controller 36 has already switched on the laser 80, or for the controller 36 only to switch the high-voltage source 68 on when the controller 36 has already switched on the laser 80. There could also be a short time-offset between switching on the laser 80 and the application of the high voltage to the ring 74, in order to ensure that the plasma jet has already reached the life form 56 before the high voltage is present at the ring 74. Possible spark strikes between the ring 74 and other objects located on the field that are not unwanted life forms are avoided in this way.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency trade-offs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the systems, methods, processes, apparatuses and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The foregoing detailed description has set forth various embodiments of the systems, apparatuses, devices, methods and/or processes via the use of block diagrams, schematics, flowcharts, examples and/or functional language. Insofar as such block diagrams, schematics, flowcharts, examples and/or functional language contain one or more functions and/or operations, it will be understood by those within the art that each function and/or operation within such block diagrams, schematics, flowcharts, examples or functional language can be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the signal bearing medium used to carry out the distribution. Examples of a signal bearing medium include, but are not limited to, the following: a computer readable memory medium such as a magnetic medium like a floppy disk, a hard disk drive, and magnetic tape; an optical medium like a Compact Disc (CD), a Digital Video Disk (DVD), and a Blu-ray Disc; computer memory like random access memory (RAM), flash memory, and read only memory (ROM); and a transmission type medium such as a digital and/or an analog communication medium like a fiber optic cable, a waveguide, a wired communications link, and a wireless communication link.

The herein described subject matter sometimes illustrates different components associated with, comprised of, contained within or connected with different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two or more components herein combined to achieve a particular functionality can be seen as "associated with" each other such that the desired functionality is achieved, irrespective of architectures or intermediate components. Likewise, any two or more components so associated can also be viewed as being "operably connected", or "operably coupled", to each other to achieve the desired functionality, and any two or more components capable of being so associated can also be viewed as being "operably couplable", to each other to achieve the desired functionality. Specific examples of operably couplable include, but are not limited to, physically mateable and/or physically interacting components, and/or wirelessly interactable and/or wirelessly interacting components, and/or logically interacting and/or logically interactable components.

Unless specifically stated otherwise or as apparent from the description herein, it is appreciated that throughout the present disclosure, discussions utilizing terms such as "accessing," "aggregating," "analyzing," "applying," "brokering," "calibrating," "checking," "combining," "communicating," "comparing," "conveying," "converting," "correlating," "creating," "defining," "deriving," "detecting," "disabling," "determining," "enabling," "estimating," "filtering," "finding," "generating," "identifying," "incorporating," "initiating," "locating," "modifying," "obtaining," "outputting," "predicting," "receiving," "reporting," "retrieving," "sending," "sensing," "storing," "transforming," "updating," "using," "validating," or the like, or other conjugation forms of these terms and like terms, refer to the actions and processes of a control unit, computer system or computing element (or portion thereof) such as, but not limited to, one or more or some combination of: a visual organizer system, a request generator, an Internet coupled computing device, a computer server, etc. In one example, the control unit, computer system and/or the computing element may manipulate and transform information and/or data represented as physical (electronic) quantities within the control unit, computer system's and/or computing element's processor(s), register(s), and/or memory(ies) into other data similarly represented as physical quantities within the control unit, computer system's and/or computing element's memory(ies), register(s) and/or other such information storage, processing, transmission, and/or display components of the computer system(s), computing element(s) and/or other electronic computing device(s). Under the direction of computer-readable instructions, the control unit, computer system(s) and/or computing element(s) may carry out operations of one or more of the processes, methods and/or functionalities of the present disclosure.

Those skilled in the art will recognize that it is common within the art to implement apparatuses and/or devices and/or processes and/or systems in the fashion(s) set forth herein, and thereafter use engineering and/or business practices to integrate such implemented apparatuses and/or devices and/or processes and/or systems into more comprehensive apparatuses and/or devices and/or processes and/or systems. That is, at least a portion of the apparatuses and/or devices and/or processes and/or systems described herein can be integrated into comprehensive apparatuses and/or devices and/or processes and/or systems via a reasonable amount of experimentation.

Although the present disclosure has been described in terms of specific embodiments and applications, persons skilled in the art can, considering this teaching, generate additional embodiments without exceeding the scope or departing from the spirit of the present disclosure described herein. Accordingly, it is to be understood that the drawings and description in this disclosure are proffered to facilitate comprehension of the present disclosure and should not be construed to limit the scope thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

What is claimed:

1. A vehicle for mitigating unwanted life forms, the vehicle comprising:

a sensor system configured to detect an unwanted life form;

a first arrangement including a first electrode and a first nozzle configured to produce a first water jet, wherein a position of the first arrangement relative to the vehicle is adjustable;

a second arrangement including a second electrode and a second nozzle configured to produce a second water jet;

a voltage generator connected to the first and second electrodes;

a controller in communication with the sensor system, the voltage generator, the first electrode, the first arrangement, and the second arrangement, the controller to at least:

using a signal from the sensor system, adjust the first arrangement to a position adjacent to, yet separate from, the unwanted life form and the second electrode;

engage the first nozzle to produce the first water jet, wherein the first water jet increases a conductivity between the first electrode and the unwanted life form, wherein the first water jet includes an additive that increases a stability of the first water jet;

engage the second nozzle to produce the second water jet, wherein the second electrode is grounded through the second water jet; and after producing the first water jet and the second water jet, control the voltage generator to initiate a transfer of charge from the voltage generator through the first electrode, through the unwanted life form, and to the second electrode.

2. The vehicle of claim 1, wherein the controller is configured to control a quantity of voltage transmitted to the unwanted life form using a sensed property of the unwanted life form generated at least in part by the sensor system.

3. The vehicle of claim 2, wherein the sensed property is at least one of a size of the unwanted life form, a degree of dryness of the unwanted life form, and a temperature of the unwanted life form.

4. The vehicle of claim 1, wherein the controller is configured to modify a sensed property of the unwanted life form using the first water jet.

5. The vehicle of claim 4, wherein the sensed property is a temperature of the unwanted life form.

6. The vehicle of claim 1, further including an actuator, wherein the first arrangement can be moved transversely with respect to a direction of travel of the vehicle, the actuator configured to pivot the first arrangement around at least one of a vertical axis and a horizontal axis oriented transversely to the direction of travel.

7. The vehicle of claim 1, wherein the controller applies high voltage to the first electrode once the controller has applied the first water jet to increase the conductivity between the first electrode and the unwanted life form.

8. The vehicle of claim 1, wherein the second electrode is grounded by a contact that penetrates a ground.

9. The vehicle of claim 1, wherein:

the first water jet is a high-pressure jet; and the controller is configured to:

bore a hole into an insulating layer of material by applying the high-pressure jet; and form an electrical connection between the high-pressure jet and the unwanted life form, the unwanted life form located under the insulating layer.

10. A method for mitigating unwanted life forms, the method comprising:

detecting, with a sensor system on a vehicle, an unwanted life form;

adjusting, with a controller, a position of a first arrangement to be adjacent to, yet separate from, the unwanted life form and a second electrode, wherein the first arrangement includes a first electrode and a first nozzle, wherein a position of the first arrangement relative to the vehicle is adjustable, and wherein the second electrode is grounded;

engaging the first nozzle to produce a first water jet, wherein the first water jet increases a conductivity between the first electrode and the unwanted life form, wherein the first water jet includes an additive that increases a stability of the first water jet;

engaging a second nozzle on a second arrangement to produce a second water jet, wherein the second electrode is grounded through the second water jet; and after producing the first water jet and the second water jet, initiating, with the controller, a transfer of voltage from a voltage generator through the first electrode, through the unwanted life form, and to the second electrode.

11. The method of claim 10, further including controlling a quantity of voltage transmitted to the unwanted life form using a sensed property of the unwanted life form generated at least in part by the sensor system.

12. The method of claim 11, wherein the sensed property is at least one of a size of the unwanted life form, a degree of dryness of the unwanted life form, and a temperature of the unwanted life form.

13. The method of claim 11, further including adjusting the sensed property of the unwanted life form the first water jet.

14. The method of claim 13, wherein the sensed property is temperature of the unwanted life form.

15. The method of claim 10, further including an actuator, wherein the first arrangement can be moved transversely with respect to a direction of travel of a vehicle on which the first arrangement is mounted, the actuator configured to pivot the first arrangement around at least one of a vertical axis and a horizontal axis oriented transversely to the direction of travel.

16. The method of claim 10, further including applying high voltage to the first electrode once the controller has applied the first water jet to increase the conductivity between the first electrode and the unwanted life form.

17. The method of claim 10, wherein:

the first water jet is a high-pressure jet;

the method includes:

boring a hole into an insulating layer of material by applying the high-pressure jet; and forming an electrical connection between the high-pressure jet and the unwanted life form, the unwanted life form located under the insulating layer.

18. A system comprising:

a vehicle;

an apparatus for mitigating unwanted life forms mounted to the vehicle, the apparatus including:

a sensor system configured to detect an unwanted life form;

a first arrangement including a first electrode and a first nozzle configured to produce a first water jet, wherein a position of the first arrangement relative to the vehicle is adjustable;

a second arrangement including a second electrode and a second nozzle configured to produce a second water jet;

a voltage generator connected to the first and second electrodes;

a controller in communication with the sensor system, the voltage generator, the first electrode, the first arrangement, and the second arrangement, the controller to at least:

using a signal from the sensor system, adjust the first arrangement to a position adjacent to, yet separate from, the unwanted life form and the second electrode;

engage the first nozzle to produce the first water jet, wherein the first water jet increases a conductivity between the first electrode and the unwanted life form, wherein the first water jet includes an additive that increases a stability of the first water jet;

engage the second nozzle to produce the second water jet, wherein the second electrode is grounded through the second water jet; and after producing the first water jet and the second water jet, control the voltage generator to initiate a transfer of charge from the voltage generator through the first electrode, through the unwanted life form, and to the second electrode; and an actuator, the actuator configured to be controlled by the controller.

\* \* \* \* \*